(No Model.)

H. J. MILLAR.
COMBINED REEL AND TRANSPORTATION CASE.

No. 384,328. Patented June 12, 1888.

Witnesses:
J. P. Theo Lang.
E. J. Fenwick.

Inventor:
Henry J. Millar,
by his Atty's
Mason, Fenwick & Lawrence.

N. PETERS, Photo-Lithographer, Washington, D. C.

UNITED STATES PATENT OFFICE.

HENRY J. MILLAR, OF UTICA, NEW YORK.

COMBINED REEL AND TRANSPORTATION-CASE.

SPECIFICATION forming part of Letters Patent No. 384,328, dated June 12, 1888.

Application filed February 8, 1888. Serial No. 263,325. (No model.)

*To all whom it may concern:*

Be it known that I, HENRY J. MILLAR, a citizen of the United States, residing at Utica, in the county of Oneida and State of New York, have invented certain new and useful Improvements in a Combined Coiled-Pipe Reel and Transportation-Case; and I do hereby declare the following to be a full, clear, and exact description of the invention, such as will enable others skilled in the art to which it appertains to make and use the same.

My invention consists in a novel construction, combination, and arrangement of the parts composing my improved combined coiled-pipe reel and transportation-case, whereby the pipe can be wound upon the drum of the reel by the manufacturer and inclosed so as to be protected against injury while being transported on railroads or otherwise from place to place, and on its arrival can be uninclosed and uncoiled from the drum by the seller accordingly as his retail customers buy different quantities thereof. The combined reel and transportation-case is furnished with a stand and an axial shaft, and is adapted for being revolved on said shaft and also for being raised from one story to another by a sling applied to its projecting ends or to the ends of the shaft on which it is turned.

Figure 1:
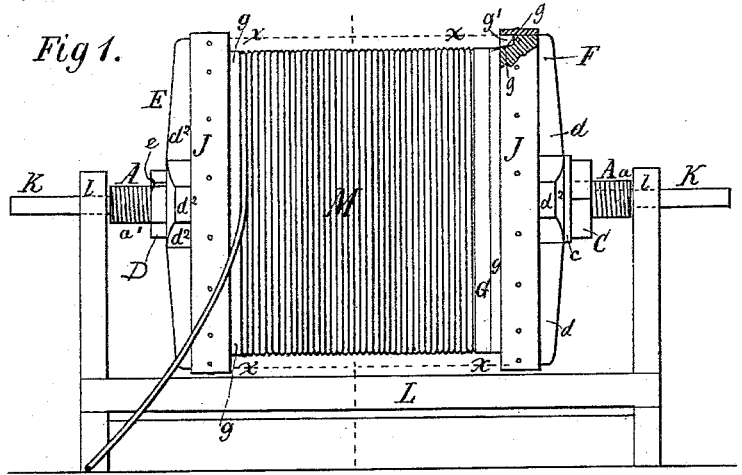
Figure 2:
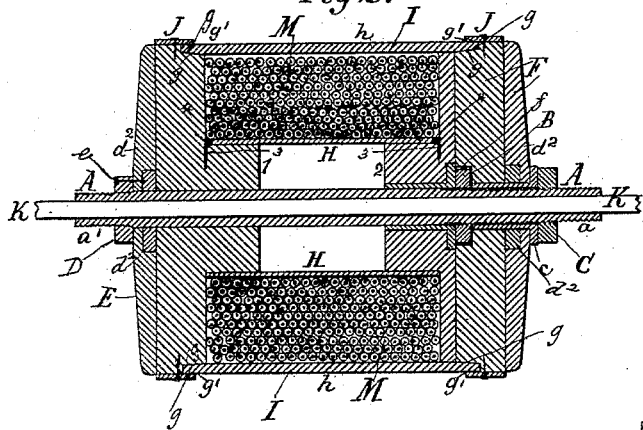
Figure 3:
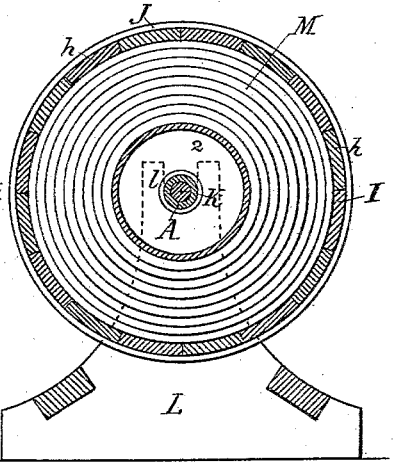
Figure 4:
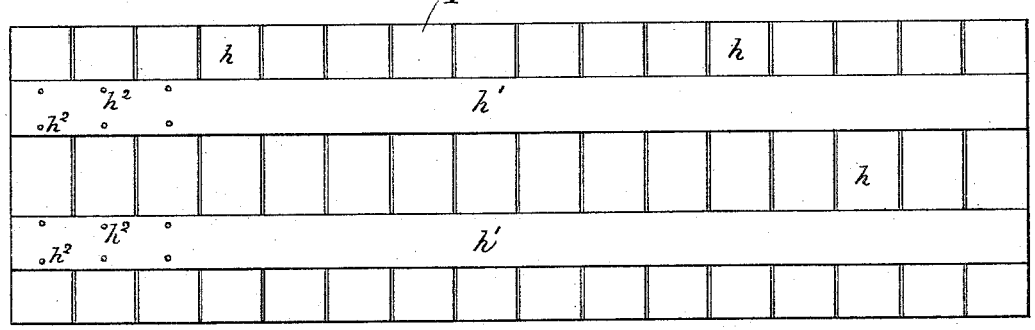
Figure 5:
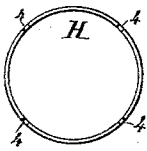

In the accompanying drawings, Figure 1 is a side elevation of my combined coiled-pipe reel and transportation-case mounted upon its axial shaft and stand, and with the coiled pipe uncovered so as to be uncoiled from the drum of the reel. The dotted lines $x\ x$ in said figure indicate the place occupied by the covering and protecting staves. Fig. 2 is a longitudinal section of the reel and transportation-case, showing the covering-staves in position and the axial shaft passed through the central tube of the reel and case. Fig. 3 is a transverse section of Fig. 1, the covering and protecting staves being in position. Fig. 4 is a plan view of the covering-staves and their connecting belting or listing. Fig. 5 is an end view of the drum of the reel.

In the accompanying drawings, A represents a central tube which forms an eye for an axial shaft, K, and also by aid of nuts B and C and a collar or shoulder, D, serves the purpose of a tie between the several main constituent parts E, F, G, H, and I of the improved combined reel and transportation-case for coiled lead pipe shown in the accompanying drawings, the said parts being fitted around said tie-tube, as will now be more fully described.

The tie-tube A is screw-threaded, as at $a$, or otherwise suitably, and the heads E, F, and G are fitted upon it by means of metal bushings or shouldered wearing portions, as $b$ and $c$, in the manner shown or in other appropriate way. The two outer heads, E F, are formed with strengthening cross-cleats $d'$ in a well-known manner of staying analogous parts of structures, and the head E is kept from turning and slipping longitudinally on the tie-tube A by a shouldered pin, $e$, let into a groove in the collar or shoulder D, as shown, or by other suitable means. The part D may be fastened by a screw-thread on the tie-tube, or it may be welded on said tube, or it may be otherwise secured upon the tube.

On the inner face of the head E and the inner face of the intermediate head G are respectively formed short hubs, as 1 and 2, and on the periphery of each of these hubs, just about where they start out from the drum-heads E and G, narrow stop-lugs 3 are provided, and between the heads upon the hubs the metal drum H, open at both ends and provided with notches 4, corresponding to the stop-lugs 3, is fitted and kept in place and from turning by means of the lugs 3 fitting into the notches 4 of the said drum.

The inner head G slips over the screw-thread $a$ of the tie-tube A, and it and the drum H and outer head E are bound firmly together by means of the nut B, which, when screwed up, bears against the metal bushing or wearing-tube $b$ of the head G.

The head G is not necessarily made capable of sliding toward the nut C when the combined reel and case is employed simply for receiving and transporting the lead pipe which is wound on its drum H; but by making the tie device A tubular, providing the shaft K and stand L, and having said head G capable of sliding toward said nut and off the tie-tube the one structure can be used, either in the manner herein described and shown for receiving and transporting pipe upon its reel-drum, it being adapted for serving in such use as a winding-on and paying-out reel, or in the manner described and shown in my application, No. 263,096, filed February 6, 1888, for packing and transporting lead pipe put up into coils. To employ the invention in these modes of use, I have provided in the one structure the requisite capabilities therefor, and thus greatly enhanced the utility of the invention.

The outer head F is also formed with its wearing-tube large enough to slip freely over the screw-thread $a$, and on its inner face it is counterbored, so as to form a socket, $f$, for the reception of the nut B when the head F is slipped home and confined by the binding-nut C. The nut B is intended to be in thickness equal to or a little greater than the depth of the said socket $f$, and thus crushing of the inner head G by the outer head F by a too violent screwing up of the nut against said outer head is rendered impossible, for the nut by bearing against the tubular bushings of the heads F and G will receive and resist any undue strain caused by screwing up the nut C.

The heads E and F are chamfered off or formed with a beveled or other suitably-shaped bearing and abutting surface, as shown at $g$, and around each of the heads, so as to extend over the said shouldered or chamfered portion, a hoop, J, of copper or other suitable material, is nailed, screwed, or otherwise suitably fastened. By thus constructing the heads endless recesses $g'$ are formed for the reception of the chamfered ends of the staves, which form the barrel-like inclosing portion I of the combined reel and transportation-case. In the manufacture of the inclosing portion I a suitable number of staves, $h$, are placed edge to edge and suitably fastened to a band or bands, as $h'$, which are of a length equal to the diameter of the chamfered part of the drum-heads. The band or bands may be applied as herein shown and the staves riveted thereto, as at $h^2$; or either of the modes of forming the inclosing portion I described in my application No. 263,096, filed February 6, 1888, may be adopted.

The flexible inclosing portion I, formed of staves and bands united as described, serves as a protection to the coiled pipe, and it occupies the position shown in Figs. 2 and 3 by full lines and by dotted lines $x\,x$ in Fig. 1 when the lead pipe is coiled upon the drum and is in transit from one place to another.

The combined reel and case described has the ends of the tie-tube extended a short distance out beyond the drum-heads of the reel, and is furnished with the solid axial shaft K, which is of greater length than the reel, and with a winding-stand, L, the latter also of greater length than the reel and having open journal-bearings $l$ for the ends of the shaft to rest in when the pipe is being wound upon it. The stand and shaft must be sufficiently long to permit the nut C and head F of the drum to be moved sidewise for the removal and insertion of the covering portion I of the structure.

The combined reel and transportation-cases herein described may be owned both by the manufacturer and the seller of the lead pipe, and when one has been received by the buyer filled with lead pipe another may be returned empty by him to the manufacturer for refilling; but the shaft and reel-stand need not be reshipped, as such parts may be provided and kept at each place.

To use my reel and transportation-case at the manufacturer's for winding lead pipe upon its drum and inclosing the pipe for transportation, the shaft K is slipped through the tie-tube and the reel set upon the stand, and now, if the covering and protecting portion are in place, the nut C is turned back on the tie-tube far enough to allow the head F to be slipped toward said nut on the shaft, so as to separate the heads E and F sufficiently to take out the inclosing covering portion I, and thereby expose the lead pipe, as illustrated in Fig. 1. The head F is now readjusted to its normal position and the nut C turned forward and made to clamp it in position. Now, wind the lead pipe M upon the drum of the reel until it fills the same, as illustrated in Fig. 3. In winding the pipe upon the reel-drum one man takes hold of the edge of the reel where the hoops are applied and pulls it toward him hand over hand, while another man guides the pipe as it comes from the supplying-machine onto the reel until the same is full. Now, again turn back the nut C, slide the head F again toward the nut, slip in the inclosing and protecting portion I below the reel and above the longitudinal tie-bars of the stand, and bring the ends together around the reel-drum and insert one of the ends of the staves of which it is composed into the recess $g'$ of the drum-head E, and now readjust the head F so as to cause the other ends of the staves to enter its recess $g'$ and turn the nut forward and clamp the parts firmly together. Now, lift the filled combined reel and case off the winding-frame, place it upon the floor and withdraw the axial shaft. This done, it is ready for shipping. If it is desired to hoist the filled combined reels and cases from one story to another at any place, this can be done by either attaching the rings of a sling to the projecting ends of the tie-tube or to the ends of the axial shaft, as deemed most desirable.

To use the reel at the store where the lead pipe is sold, it is simply necessary to pass the axial shaft through its tie-tube, mount it on the stand, turn back the nut C and the head F, withdraw the protecting covering portion I, readjust the head F and nut C to their original positions, and "pay off" the pipe in quantities such as are desired by different purchasers.

The utility of my invention is very great, from the fact that it answers as a winding and unwinding reel, as well as a transportation-case, the winding and unwinding being accomplished without causing serious angular deflections of the pipe, it going on and off without any obstruction from longitudinal bars of wood, as in some other known devices.

The structure is cheap, durable, and very convenient for handling, and by reason of its barrel-like form is freighted at a less expense than structures of a different form.

What I claim is—

1. The combined reel and transportation-case comprising in its construction a central screw-threaded tie-tube, A, provided with a stop collar or shoulder, D, heads E G F, nuts B and C, and protecting and inclosing portion I, substantially as and for the purpose described.

2. The combined reel and transportation-case comprising a central screw-threaded tie-tube, A, of greater length than the case, stop collar or shoulder D, a laterally-sliding head, F, nut C, an outer removable protecting flexible inclosing portion, I, and a removable axial shaft, K, substantially as described.

3. The combined reel and transportation-case having a body portion formed of staves flexibly connected except at one of the edges of the last two staves, a reel-cylinder, an intermediate slipping head, and two outer heads, one of which slips away from the other for the removal of the body portion, so that the pipe may be wound upon the reel-cylinder, substantially as described.

In testimony whereof I hereunto affix my signature in presence of two witnesses.

HENRY J. MILLAR.

Witnesses:
JOHN MACGILL,
LEONARD FLEISHMAN.